Aug. 23, 1927.
A. F. KLINZING
1,640,194
VALVE FOR ANIMAL DRINKING FOUNTAINS
Filed July 21, 1924
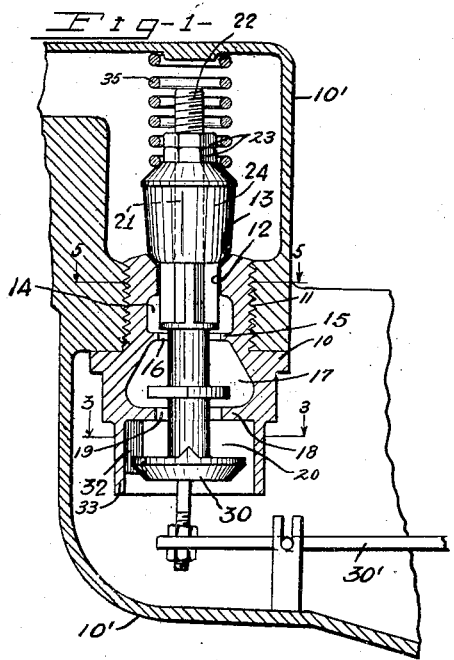
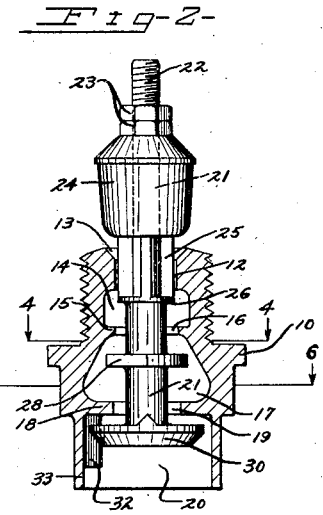
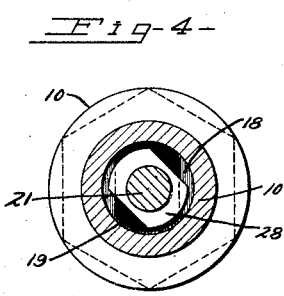
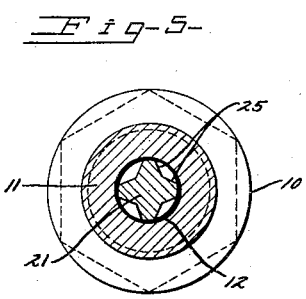
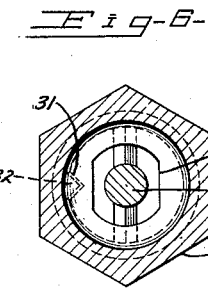
INVENTOR.
August F. Klinzing.
BY Morsell, Keeney & Morsell,
ATTORNEYS.

Patented Aug. 23, 1927.

1,640,194

UNITED STATES PATENT OFFICE.

AUGUST F. KLINZING, OF MILWAUKEE, WISCONSIN.

VALVE FOR ANIMAL DRINKING FOUNTAINS.

Application filed July 21, 1924. Serial No. 727,230.

This invention relates to valves and more especially to valves for use in connection with animal drinking fountains, and has for one of its objects to provide a valve of this character which will be simple in construction, comparatively inexpensive to manufacture and install, and more efficient in use than those which have been heretofore proposed.

A further object of the invention is to provide a valve for use in connection with animal drinking fountains in which the pressure of the nose of the animal into the bowl of the fountain opens the valve to fill the bowl. In present constructions of this character it is common practice to provide spring-controlled valves which are opened by the animal when it thrusts its nose into the bowl to drink, but these valves are of such construction that the water is discharged into the bowl with great force and will often splash out of the bowl entirely.

It is one of the primary objects of the present invention to provide a valve which will permit a free flow of water but will at the same time cut down the pressure and will discharge water into the bowl in such a manner as to eliminate all splashing.

With the above and other objects in view which will appear as the description proceeds, the invention consists in the novel details of construction and the combination and arrangement of parts more fully hereinafter described, and particularly pointed out in the appended claims.

Referring to the accompanying drawings, in which like reference characters designate like parts in all the views:—

Figure 1 is a central vertical sectional elevational view of a valve constructed in accordance with the present invention, the parts being shown with the valve in its closed position, the view also showing portions of the drinking bowl and fountain;

Fig. 2 is a view of the valve similar to Fig. 1, the parts being shown in the open position and the spring being omitted;

Fig. 3 is a horizontal cross sectional view taken approximately on the plane indicated by the line 3—3 of Fig. 1, looking down;

Fig. 4 is a view similar to Fig. 3 taken approximately on the plane indicated by the line 4—4 of Fig. 2;

Fig. 5 is a similar view taken aproximately on the plane indicated by the line 5—5 of Fig. 1; and Fig. 6 is a similar view taken approximately on the plane indicated by the line 6—6 of Fig. 2.

Referring more especially to the said drawings, 10 indicates generally the valve casing which preferably takes the form of a plug provided with the reduced threaded portion 11, whereby it may be screwed into the drinking bowl 10′ at the proper point. The said plug is provided with a bore 12, the upper portion of which is provided with a seat 13, while the lower end of said bore communicates with a somewhat enlarged chamber 14, as will be clear from Figs. 1 and 2. The lower extremity of the chamber 14 is defined by inwardly projecting annular flange 15 having the opening 16 which leads into a second chamber 17 which is of somewhat greater capacity than the chamber 14 and which preferably flares outwardly as clearly shown in the drawings.

The lower elements of the chamber 17 are defined by an inwardly projecting flange 18 which is provided with a central opening 19, which opening is more or less rectangular in shape, as is clearly indicated in Fig. 6.

The portion of the plug 10 below the chamber 17 is hollowed out to form a discharge chamber 20, the lower end of which is open and is adapted to discharge directly into the drinking bowl, not shown.

Slidably mounted in the bore 12 of the plug member is a valve stem 21, the upper end of which is threaded as indicated at 22 to receive the lock nuts 23, by means of which the flexible valve member 24 may be movably held in position on the said stem 21. The portion of the valve stem 21 which slides in the bore 12 is fluted or provided with ribs 25 whereby water may pass through said bore 12 when the valve member 24 is unseated, as shown in Fig. 2.

The valve stem 21 at the lower end of the flutes or ribs 25 is provided with the outwardly projecting flange 26 which is of a diameter only slightly less than the diameter of the opening 16 in the inwardly projecting flange 15 of the plug member 10. The said flange 26 is normally positioned within the chamber 14, as shown, while within the chamber 17 there is positioned a second flange 28 also rigid with the valve stem 21. This flange 28 is shaped substantially the same as the opening 19 in the flange 18 of the plug member or housing and is of slightly less dimensions than the said opening whereby it may freely pass therethrough in order to assemble the parts.

The lower end of the valve stem 21 is provided with an enlarged head 30 which is notched at 31 at one point on its circumference to receive an integral rib or lug 32 formed upon the inner circumference of the lower annular portion 33 of the plug 10. This said rib and recess constitute a guide for the valve stem 21 whereby rotation of the same may be prevented, as will be readily understood.

The valve member 24 is normally retained against its seat 13 by means of the coiled spring 35 resting upon the upper surface of the said valve member, the upper end of the said spring engaging a portion of the fountain 10', whereby the spring may be placed under compression.

In operation the valve is opened by means of an operating lever 30' pivotally mounted in the drinking bowl, one end of which lever engages the head 30 of the valve stem, while the other end, not shown, of the said lever is adapted to be engaged by the nose of the animal as it is thrust into the bowl. The parts are so constructed that the operation of the animal-actuated lever will raise the valve stem 21, carrying with it the valve member 24 against the compression of the spring 35 and thereby permit water from above the valve 24 to pass downwardly through the bore 12, past the flange 26 of the valve stem 21, and into the chamber 14. Here the water will impinge upon the inwardly projecting flange 15 and will then pass through the opening 16 into the second chamber 17, from whence it will pass through the opening 19 into the discharge chamber 20 and then into the bowl. In its passage through the latter chambers 17 and 20 the water will be caused to take a more or less tortuous path due to the presence of the flange 28 and the head member 30 of the valve stem, which will have the effect of reducing the pressure of the water to such an extent that it will emerge from the discharge chamber 20 practically without force. The reduction of pressure is also facilitated by the fact that chambers 14, 17 and 20 are of constantly increasing capacity and the water will therefore emerge from the chamber 20 in such a manner that all splashing thereof will be substantially eliminated.

It might be noted that in assembling the parts the valve plug 24 is removed from the valve stem, whereupon the said stem is introduced upwardly into the casing or housing 10, the substantially rectangular flange 28 passing through the complementally shaped opening 19 and then being turned somewhat as shown in Figs. 2 and 4 to prevent the stem from unintentionally moving downwards and being displaced. This turning movement is of such moment as to bring the notch 31 of the head 30 into alignment with the rib 32, whereupon the stem may be raised to substantially the position shown in Fig. 2, after which the plug member 24 is placed in position upon the stem and locked thereon by means of the lock-nuts 23. The parts, of course, may be disassembled by reversing the procedure just outlined.

While one form of the invention has been illustrated and described, it is obvious that those skilled in the art may vary the details of construction as well as the arrangement of parts without departing from the spirit of the invention, and therefore it is not wished to be limited to the above disclosure except as may be required by the claims.

What is claimed is:

1. A valve of the class described comprising a casing having a seat, a bore, and a plurality of enlarged chambers communicating with said bore, defined by projecting annular flanges; and a valve plug co-acting with said seat, provided with a stem having a fluted portion slidably mounted in said bore, said stem also having flanges positioned relative to said casing flanges to provide a tortuous path for the fluid passing through said casing.

2. A valve of the class described comprising a casing having a seat, a bore, and a plurality of enlarged chambers communicating with said bore, defined by projecting annular flanges, said chambers being of successively increasing capacity; and a valve plug co-acting with said seat, provided with a stem having a fluted portion slidably mounted in said bore, said stem also having flanges positioned relative to said casing flanges to provide a tortuous path for the fluid passing through said casing.

3. In a valve of the class described comprising a chambered casing and a valve plug having a stem mounted within said casing, said casing and stem being provided with co-operating projections arranged to provide a tortuous passage for fluid passing through said casing.

4. In a valve of the class described, a casing having a seat, a bore, a relatively small chamber communicating with said bore, a larger chamber communicating with said first chamber, and a still larger discharge chamber communicating with said second chamber, said chambers being separated by inwardly projecting annular flanges; and a valve plug having a stem mounted in said bore and provided with outwardly projecting flanges moving within said chambers and providing a tortuous path for the fluid passing through said casing.

5. In a valve of the class described, a casing having a seat, a bore, a relatively small chamber communicating with said bore, a larger outwardly flaring chamber communicating with said first chamber, and a still larger discharge chamber communicating with said second chamber, said chambers being separated by inwardly projecting flanges, the flange between said second and third chambers having a substantially rectangular opening therein; a valve stem slidably mounted in said bore, provided with flanges co-operatively arranged relative to said casing flanges to provide a tortuous passage for the fluid passing through said casing, the stem flange adjacent the casing flange having the rectangular opening being also substantially rectangular in shape and angularly disposed relative to said opening; and a valve plug removably carried by said stem.

6. In a valve of the class described, a casing having a seat, a bore, a relatively small chamber communicating with said bore, a larger outwardly flaring chamber communicating with said first chamber, and a still larger discharge chamber communicating with said second chamber, said discharge chamber having an inwardly projecting vertical rib therein, said chambers being separated by inwardly projecting flanges, the flanges between said second and third chambers having a substantially rectangular opening therein; a valve stem slidably mounted in said bore, provided with a head and with flanges co-operatively arranged relative to said casing flanges to provide a tortuous passage for the fluid passing through said casing, the stem flange adjacent the casing flange having the rectangular opening being also substantially rectangular in shape and angularly disposed relative to said opening, said head being provided with a recess for receiving said casing rib; and a valve plug removably carried by said stem.

In testimony whereof, I affix my signature.

AUGUST F. KLINZING.